United States Patent [19]

Corompt

[11] 3,988,035
[45] Oct. 26, 1976

[54] LOCKING DEVICE, IN PARTICULAR FOR A HANDLING CRANKED ARM MOUNTED ON A VEHICLE

[75] Inventor: Antoine Corompt, Saint-Etienne, France

[73] Assignee: Bennes Marrel, Saint-Etienne, France

[22] Filed: Feb. 28, 1975

[21] Appl. No.: 553,983

[30] Foreign Application Priority Data
Mar. 1, 1974 France .................. 74.07879

[52] U.S. Cl. .................. 298/12; 214/515
[51] Int. Cl.² .................. B60P 1/64
[58] Field of Search .................. 298/12; 214/515

[56] References Cited
UNITED STATES PATENTS
1,883,472  10/1932  Barrett .................. 298/12
3,825,137   7/1974  Mackrill .................. 298/12

*Primary Examiner*—Philip Goodman
*Attorney, Agent, or Firm*—Browdy and Neimark

[57] ABSTRACT

The invention relates to a safety locking device for handling a container 30.

The foot 2 of the cranked arm 1 is provided with a hook 6 adapted to come and fit under the nose 7 of the sub-chassis 4 (use as a tipping bucket). A ramp 15 allows releasing said hook when the sub-chassis 4 bears on the chassis 25 of the vehicle (use for unloading the container).

Application: automatic locking and unlocking of the linking system of a handling unit, depending on whether the letter is used for loading a container or tipping said container.

9 Claims, 8 Drawing Figures

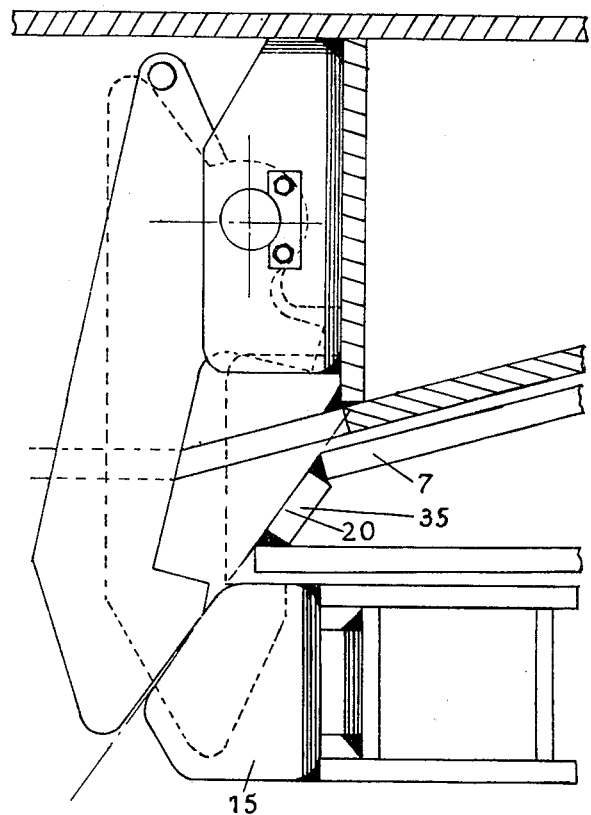

LOCKING DEVICE, IN PARTICULAR FOR A HANDLING CRANKED ARM MOUNTED ON A VEHICLE

The invention relates to a locking device, in particular for a handling cranked arm mounted on a vehicle.

A cranked arm of this type is pivotingly mounted on an intermediate sub-chassis, the rear part of which is in turn pivoted on the rear part of the chassis of the vehicle. The assembly is intended for receiving a box or container. Loading and unloading are carried out by means of a hook which is fitted to the free end of the cranked arm and adapted to fit under an ear provided on the front end of the box or container. This handling is carried out by means of a jack, the cranked arm rocking first about the pin by which it is linked to the sub-chassis, and then about the pin by which said sub-chassis is linked to the vehicle. After the container has been positioned on the assembly, the container is locked in position by means of a transverse bracket which is provided at the lower part of the container and engages in U-shaped openings provided on the sub-chassis, said openings facing the rear of the vehicle. Said engagement is obtained by the foot of the cranked arm sliding inside the sleeve which connects said arm to the sub-chassis.

This type of device has drawbacks, in particular when it is desired to tip the container after the manner of a tipping bucket, while keeping it carried by the vehicle. As a matter of fact, the locking bracket on the container is the only member which ensures the rigidity of the linking between the cranked arm and the sub-chassis when the container is locked and half-rocked. Consequently, if, as a result of a wrong move, the bracket happens to free itself from the sub-chassis, the cranked arm and the sub-chassis tend to bend back over each other, so that the container is not firmly held any more, and runs the risk of rocking abruptly, while producing a dangerous shock.

The object of the invention is to obviate such drawbacks by providing a safety locking device which allows locking the sleeve of the cranked arm on the sub-chassis to maintain said arm and said sub-chassis in prolongation of each other even in the event of the container bracket getting free inopportunely.

A device according to the invention for safely locking a handling system comprising a cranked arm, the foot of which slides inside a sleeve pivoted on an intermediate sub-chassis which is in turn pivoted to the rear part of the chassis of a vehicle, is characterized in that it includes at least one hook which is pivoted on the sleeve of the foot of the cranked arm along a transverse and horizontal axis, said hook being adapted to engage under the front nose of the sub-chassis as soon as the foot of the cranked arm comes to lie in prolongation of the sub-chassis when the latter does not rest on the vehicle chassis, which is provided with means which allow the hook to be released automatically as soon as the sub-chassis comes to rest on the chassis of the vehicle.

In this way, even in the event of the locking bracket on the container getting free from the sub-chassis while the latter is raised, the foot and the sleeve of the cranked arm keep being in prolongation of the sub-chassis, owing to the fact that the locking hook is engaged.

According to another feature of the invention, the means for releasing the hook automatically comprise a ramp fixed on a cross member of the chassis of the vehicle in a manner such that the nose of the hook slides along said ramp when the sub-chassis comes to bear on the chassis, so that the hook then frees itself from the nose of the sub-chassis.

According to another feature of the invention, a stop is provided on the hook, under the axis of pivotement of the latter, said stop acting to limit the swinging of the hook towards the rear of the vehicle in order that the distance between the end of the hook and the pivot spindle of the cranked arm on the sub-chassis be always smaller than the distance between the nose of the sub-chassis and said pivot spindle. In this way, the hook is always able to pass under the nose of the sub-chassis when the foot and the sleeve of the cranked arm come to lie in prolongation of said sub-chassis.

According to another feature of the invention, the hook swings under the action of its own weight.

According to another feature of the invention, the nose of the sub-chassis defines a flat surface which is parallel to the pivot spindle connecting the cranked arm to the sub-chassis, and directed in a manner such that its upper portion is nearer to said spindle than its lower portion, said surface being prolonged towards the front of the vehicle by the ramp.

According to another feature of the invention, the sub-chassis is constituted by two lateral arms, the front ends of which define the nose of the sub-chassis, while two safety hooks are provided, each of which is adapted to fit on the front end of one of said arms.

According to another feature of the invention, the nose of the sub-chassis is constituted by two additional ramps, each of which is fixed to the end of one of the arms.

According to a modified embodiment, the nose of the sub-chassis consists of two flat bar pieces which constitute each the front end of one of the arms, and have the dip required.

According to a further modified embodiment, the nose of the sub-chassis consists of two initially round bar pieces which constitute each the front end of one of the arms, and have a flat portion so as to provide a flat surface oriented according to the dip required.

The accompanying drawing, which is given by way of non-limiting example, will allow understanding the features of the invention more clearly.

FIGS. 4 and 5 are views of two modified embodiments.

FIG. 1 shows a lorry, the chassis 25 of which is provided with a handling system equipped with a locking device according to the invention.

Figure 1:
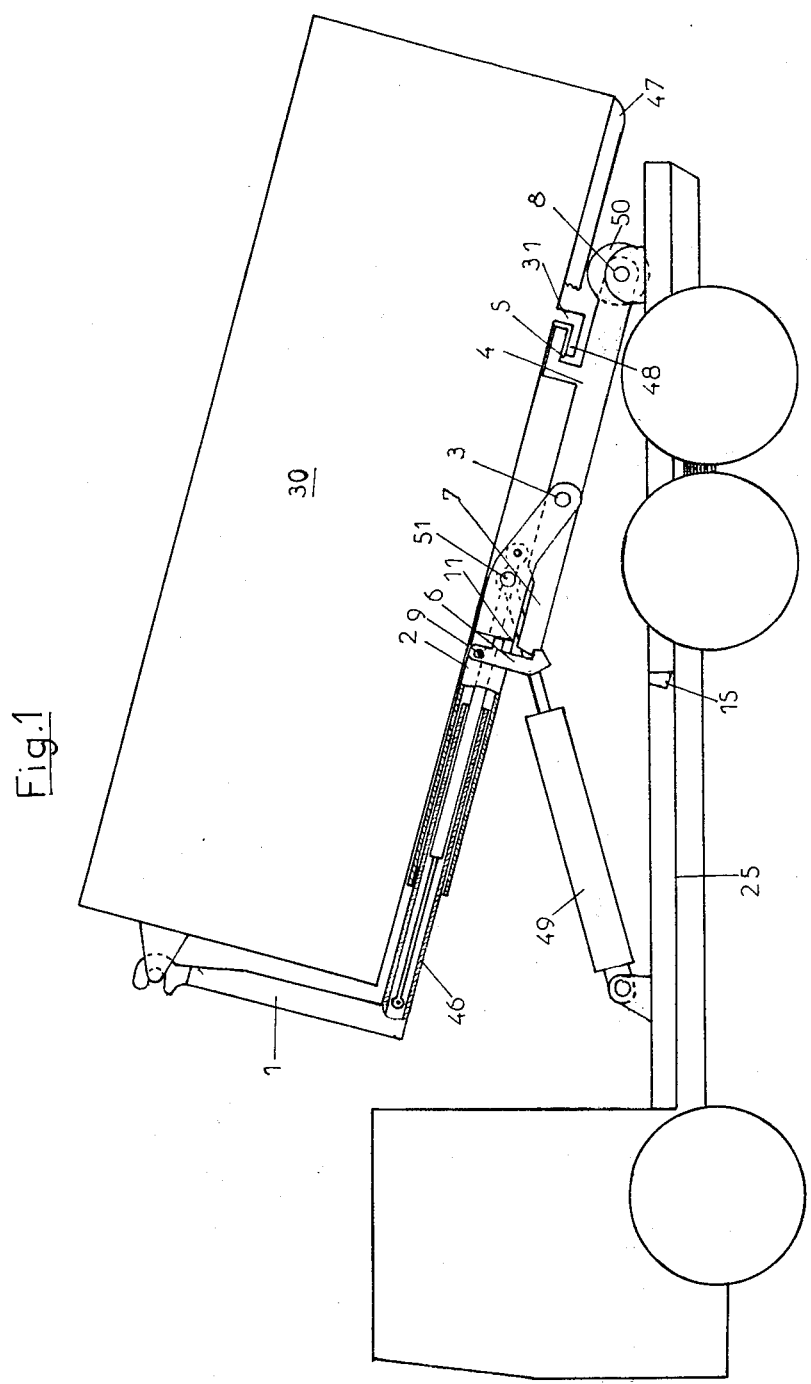
FIG. 1 is a general view of a vehicle, the handling cranked arm of which is provided with a locking system according to the invention, the assembly being shown in the case of the container being used after the manner of a tipping bucket.

This handling system comprises a cranked arm 1, the foot 46 of which slides inside a sleeve 2. Said sleeve is pivoted on a sub-chassis 4 by means of a pivot spindle 3. A raising jack 49 connects the chassis 25 to a pivot pin 51 of the sleeve 2. The sub-chassis 4 is constituted by two lateral arms which define U-shaped openings 5, the latter facing the rear of the lorry. Said sub-chassis is pivoted on the rear of the vehicle about an axis 8. The front ends 7 of the lateral arms are adapted each to fit on a safety hook 6 according to the invention. The safety hook 6 is pivoted on the sleeve 2 about an axis 9 which is parallel to the axis or pivot spindle 3. The opening of said hook is facing the rear part of the lorry. The hook 6 is provided, besides, with a stop 10, which lies under the axis or spindle 9 and limits the swinging motion of the hook in the direction of the rear part of the lorry. Said stop is capable of bearing against the cross member 11 of the sleeve 2. The operative portion or catch of the hook is constituted by a flat surface 12 which is parallel to the spindle 9 and substantially horizontal when the stop 10 comes into contact with the cross member 11. The end of the hook defines the oblique surface 14, which is intended to come and slide against the front end 7 of the corresponding arm 4, and against a ramp 13 which is integral with a cross member 16 of the chassis of the vehicle. The ramp 15 is located under the front end 7 of the arm 4.

Said end 7 defines a flat surface 20, which is parallel to the spindle 3 and inclined in a manner such that its upper portion is nearer to said spindle than its lower portion. When the sub-chassis 4 bears against the chassis 25, said surface 20 is prolonged by the end of the ramp 15 which defines a surface 22.

Lastly, a locking bracket 31 is provided under the bottom of the container 30, which bracket does not project below the longitudinal girders 47 of the latter. Said bracket consists of a transverse L iron, the lower flange 48 of which projects forwardly.

Figure 6:
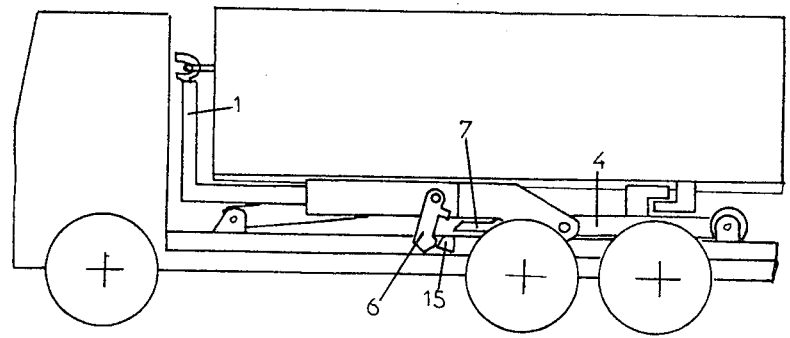
FIGS. 6, 7 and 8 are views which explain the way the safety hook works when the arrangement is used for laying down the container on the ground or loading it on the vehicle.

The operation is as follows:

When the container 30 is at rest, after being loaded on the lorry (FIG. 6), the end of the hook 6 bears against the ramp 15, so that the latch 12 of said hook is clear of the nose 7 of the sub-chassis 4. The lower bracket 31 is locked under the U-shaped openings 3 through its flange 48.

If the user wants to raise the container 30 after the manner of a tipping bucket (FIG. 1), it is only necessary for him to operate the jack 49 in the direction of the extension thereof. At the start of the motion, the bracket 31, which is locked in the openings 5, prevents by itself any pivoting motion by the sleeve 2 of the cranked arm about the pivot spindle 3. As soon as the assembly 1-2-4-30, which has thus become rigid, is slightly raised above the chassis 25, the hook 6 gets free from the ramp 15, and its latch 12 comes to engage under the front ends 7 of the sub-chassis 4, whereby the locking is reinforced (FIG. 1). In this way, even if eventually the container 30 moves back by accident (as a result, for instance, of a wrong move of the foot 46 which might slide back into the sleeve 2, which would result in freeing the bracket 31 from the locking openings 5), the sleeve 2 and the foot 46 of the cranked arm 1 are kept aligned with the sub-chassis 4. Consequently, there is no risk of the assembly 1-2-46-4 bending on itself about the axis 3.

Figure 7:
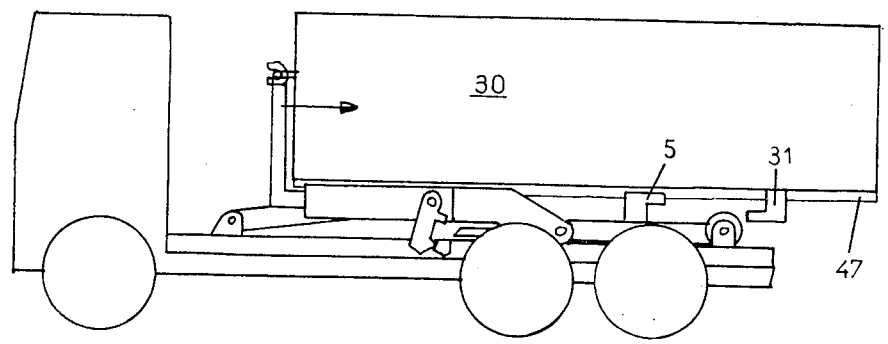

On the other hand, if the user wants to lay down the container 30 on the ground from the position illustrated in FIG. 1, he starts with retracting the telescopic foot 46 into the sleeve 2 (FIG. 7). This action makes the container 30 move back, while the bracket 31 gets free from the openings 5, but the hook 6 remains in the unlocked position shown in FIG. 6.

Figure 8:
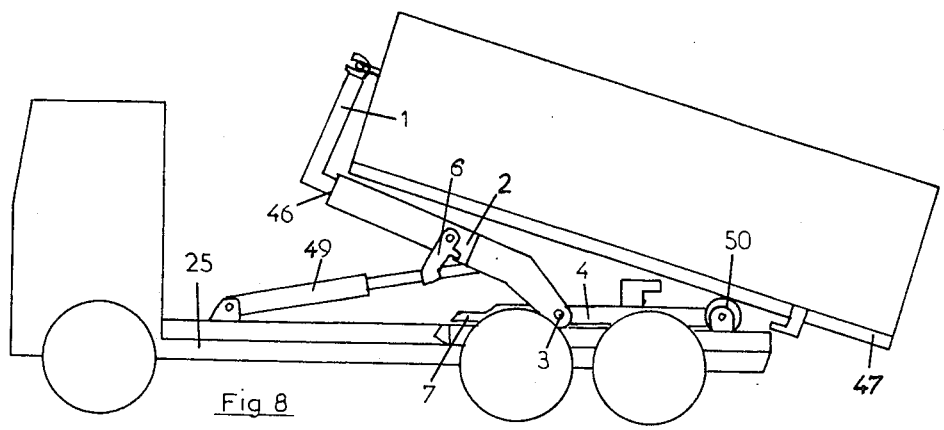

If the user operates then the raising jack 49 to extend it, the sleeve 2 is lifted by pivoting about its axis 3, while the ramp 14 of the hook 6 slides along the inclined surfaces 22 and 20 and escapes thus from the nose 7 of the sub-chassis 4. Said sub-chassis 4 remains thus unmoved on the chassis 25, while the cranked arm 1-2-46 rocks and raises the container 30 to lay it down then on the ground in the known way (FIG. 8). During this motion, the longitudinal girders 47 of the container 30 run over the rear rollers 50 of the lorry, and the hook 6 keeps bearing on the cross member 11 through its stop 10.

According to a modified embodiment of the invention, the surface 20 of the front end 7 of each arm of the sub-chassis 4 is constituted by a flat iron piece 35, as shown in FIG. 4.

According to a further embodiment, said surface 20 is constituted by a round bar piece 40, which has been filed so as to remove the portion 41 (FIG. 5).

Figure 2:
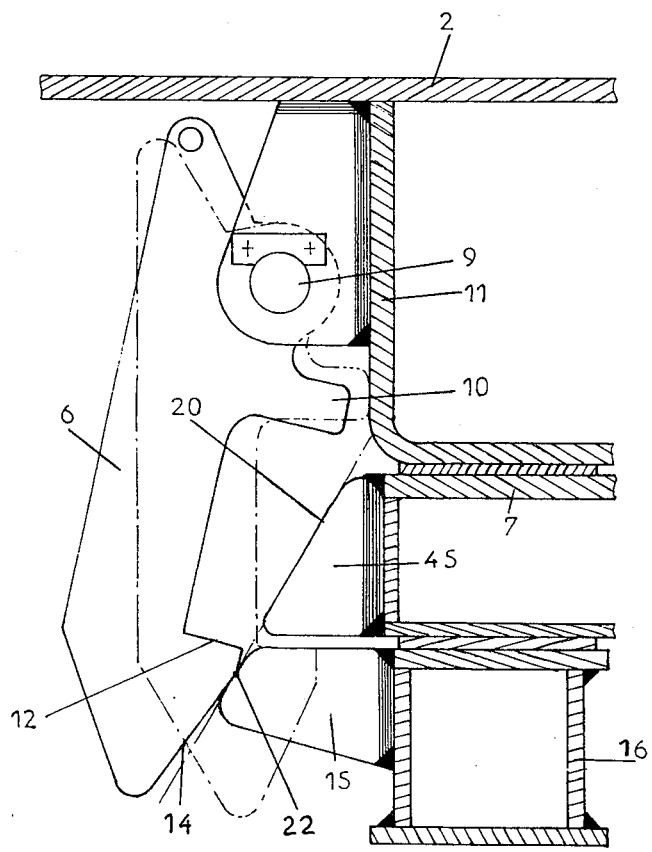
FIG. 2 is a detailed view of the safety hook according to the invention.
Figure 3:
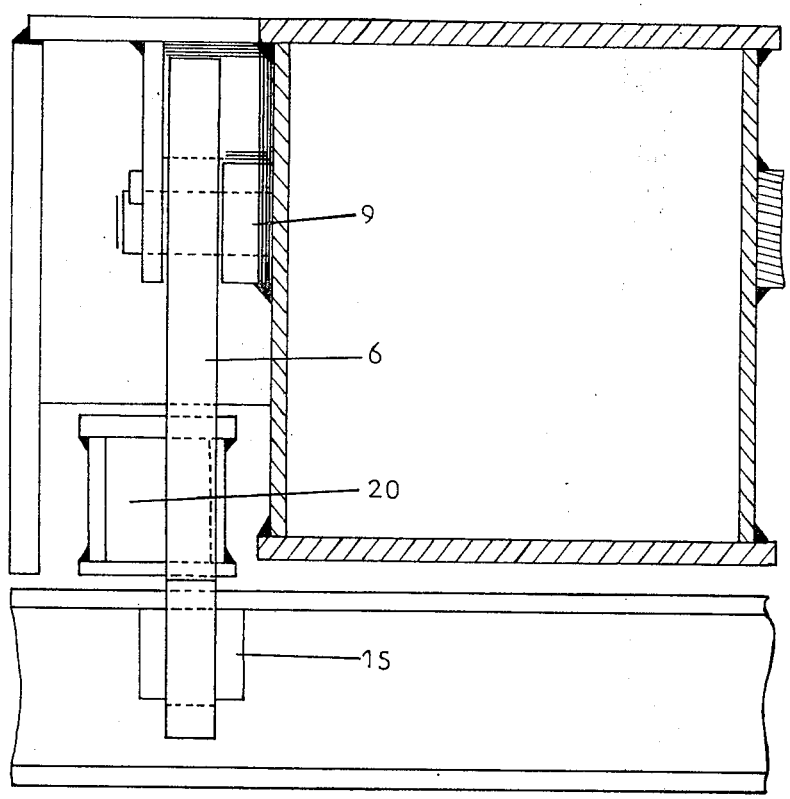
FIG. 3 is a side elevational view of said hook.

In the embodiment illustrated in FIG. 2, the surface 20 is constituted by a lug 45 which is welded on the front end 7 of the corresponding arm.

The essential advantage of the invention lies in the fact that the hooks 6 guide the handling system 1-2-4-46, and keep it rigid even in the event of a wrong move, whereby any risk of shock or unlocking by the effect of the weight of the container 30 is removed.

I claim:

1. A safety locking device for a handling system, the device comprising, in combination:

a rear part of a vehicle chassis, an intermediate subchassis having a nose portion, said intermediate chassis being pivotably mounted on said rear part and restable on said vehicle chassis; a sleeve, said sleeve being pivotally mounted on said intermediate chassis; a cranked arm having a foot, said foot being slidably mounted within said sleeve; at least one hook having a free end, nose and catch, said hook being pivotally mounted on said sleeve about an axis transverse to its longitudinal axis, said nose of said hook in its rearward pivoted position being positioned beneath said nose portion of said subchassis with said foot of said crank arm lying in prolongation of said subchassis; and hook-contacting means carried by said vehicle chassis, said nose of said hook being slidably positionable against said hook-contacting means to effect automatically release of said hook from said nose portion of said subchassis upon engagement of said subchassis with said vehicle chassis.

2. A device according to claim 1, wherein said vehicle chassis includes a cross member, and said hook-contacting means comprises a ramp on said cross member, said nose of said hook being slidable along said ramp when said subchassis and said vehicle chassis come into engagement.

3. A device according to claim 1, including a pivot spindle conectng said cranked arm to said subchassis, a cross member on said cranked arm, stop means on said hook, said stop means coming into contact with said cross member on said cranked arm for limiting swinging motion of said hook toward the rear of the vehicle to keep distance between said free end of said hook and said pivot spindle smaller than the distance between said nose portion of said subchassis and said pivot spindle.

4. A device according to claim 1, wherein said hook is a hook which swings under action of its own weight.

5. A device according to claim 1, including a pivot spindle connecting said cranked arm to said subchassis, and wherein said nose portion of said subchassis defines a plane surface which is parallel to said pivot spindle connecting said cranked arm to said subchassis, its upper portion being nearer to said spindle than its lower portion and said surface extending as a ramp toward the front of the vehicle.

6. A device according to claim 1, wherein said at least one hook comprises two hooks and said subchassis includes two lateral arms having front ends which constitute said nose portion of said subchassis, each of said hooks being fittable over respective ones of said front ends.

7. A device according to claim 6, wherein said nose portion of said subchassis defines a plane surface of said subchassis and includes two ramps, each fixed respectively to a respective end of a different one of said arms.

8. A device according to claim 1, wherein said subchassis includes two lateral arms and said nose portion defines a plane surface, said plane surface being constituted by two flat iron pieces fixed each to a front end of one of said arms.

9. A device according to claim 1, wherein said nose portion defines a plane surface and is constituted by two round bar pieces, and said subchassis includes two arms, each of said bar pieces being fixed on a front end of one of said arms and having a flat portion.

* * * * *